(12) United States Patent
Masudaya (10) Patent No.: US 6,441,511 B1
(45) Date of Patent: Aug. 27, 2002

(54) AIR-BAG CONTROL APPARATUS FOR AVOIDING AIR BAG UNIT MALFUNCTIONS CAUSED BY ELECTROMAGNETIC WAVES

(75) Inventor: Hideki Masudaya, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/536,955

(22) Filed: Mar. 28, 2000

(30) Foreign Application Priority Data

Mar. 30, 1999 (JP) .......................................... 11-088271

(51) Int. Cl.⁷ ................................................. B60L 1/00
(52) U.S. Cl. ...................... 307/10.1; 180/274; 280/735; 340/436
(58) Field of Search ....................... 180/274; 280/728.1, 280/735; 307/9.1, 10.1; 340/436

(56) References Cited

U.S. PATENT DOCUMENTS

| | | | |
|---|---|---|---|
| 5,636,863 A | * | 6/1997 | Reid et al. .................... 280/735 |
| 5,934,704 A | * | 8/1999 | Hansen et al. ............... 340/436 |
| 5,977,653 A | * | 11/1999 | Schmid et al. ............. 307/10.1 |
| 6,012,736 A | * | 1/2000 | Hansen et al. ............... 280/735 |
| 6,020,655 A | * | 2/2000 | Heiner et al. ............... 307/10.1 |
| 6,121,692 A | * | 9/2000 | Michaels et al. ............. 307/9.1 |

FOREIGN PATENT DOCUMENTS

| | | | |
|---|---|---|---|
| DE | 195 41 998 | 5/1997 | .......... B60R/21/32 |
| DE | 198 29 730 | 1/2000 | .......... B60R/16/02 |
| EP | 0 482 234 | 4/1992 | .......... B60R/16/02 |

* cited by examiner

Primary Examiner—Jeffrey Sterrett
(74) Attorney, Agent, or Firm—Brinks Hofer Gilson & Lione (57) ABSTRACT

The present invention provides an air-bag control apparatus wherein, when an air-bag sensor detects a car collision, a switching gate passes on a modulation signal originated from a signal generation means to a first modulation circuit which modulates a carrier received from a first-carrier generation means in accordance with a pattern of the modulation signal. A modulated carrier obtained as a result of the modulation is received by a first demodulation circuit which demodulates the modulated carrier to produce a demodulated signal supplied to a signal comparison circuit. The signal comparison circuit compares the demodulated signal with the modulation signal received from the signal generation means. Only if the demodulated signal matches the modulation signal is an activation signal output for activating the air-bag unit.

8 Claims, 7 Drawing Sheets

AIR-BAG CONTROL APPARATUS FOR AVOIDING AIR BAG UNIT MALFUNCTIONS CAUSED BY ELECTROMAGNETIC WAVES

BACKGROUND OF THE INVENTION

FIELD OF THE INVENTION

In general, the present invention relates to an air-bag control apparatus provided for controlling an air-bag unit. More particularly, the present invention relates to an air-bag control apparatus that is hardly affected by noise introduced onto a line transmitting a signal the driving air-bag unit, thereby being capable of avoiding a malfunction of the air-bag unit. Description of the Related Art In recent years, there are an increasing number of cars in each of which an air-bag unit is provided on a steering wheel to protect the passengers against a shock caused by a car collision in the event of an accident.

Figure 7:
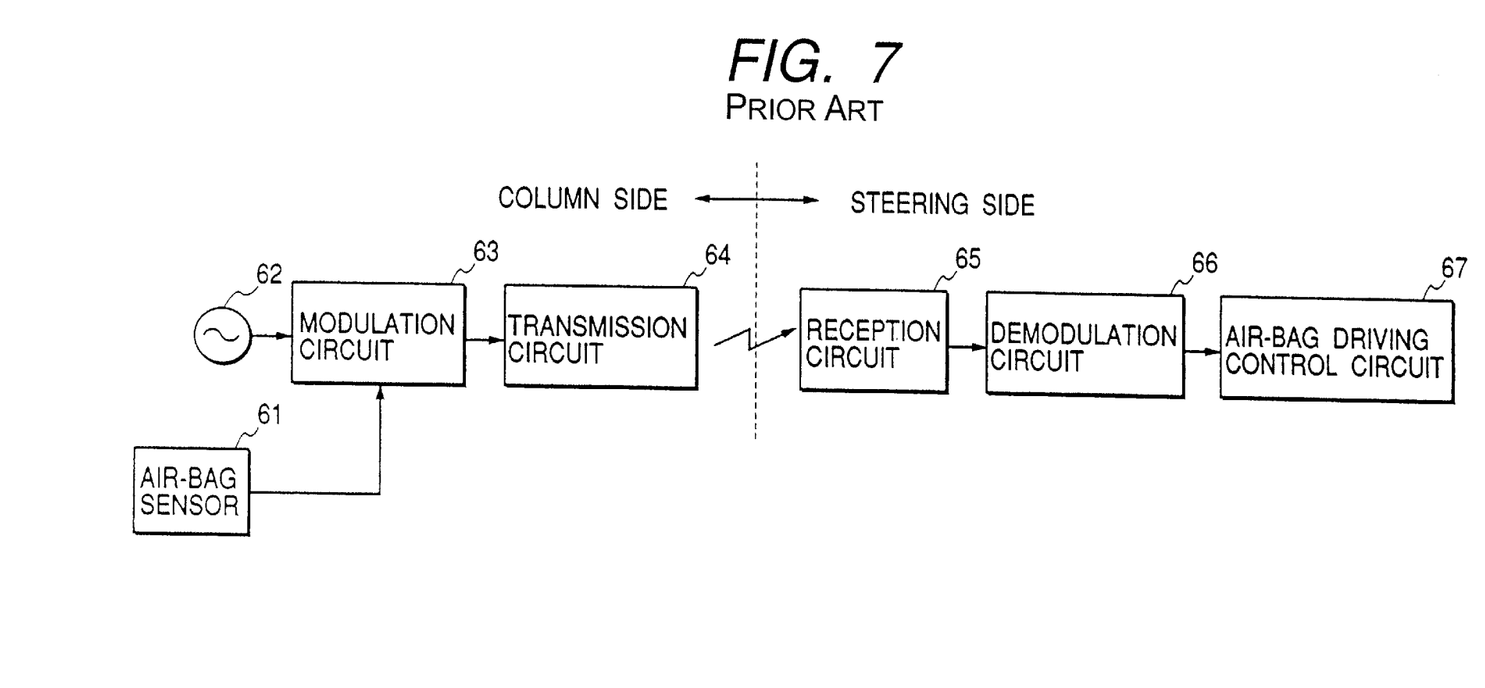
FIG. 7 is a block diagram showing the conventional air-bag control apparatus.

FIG. 7 is an explanatory diagram showing the configuration of an embodiment implementing the conventional air-bag control apparatus. As shown in the figure, on the column side, there are provided an air-bag sensor 61 for detecting a collision of the car, a carrier generation means 62 for generating a carrier, a modulation circuit 63 for modulating the carrier and a transmission circuit 64 for transmitting a modulated carrier to the steering-wheel side. On the steering-wheel side, on the other hand, there are provided a reception circuit 65, a demodulation circuit 66 and an air-bag driving control circuit 67.

Next, the operation of the embodiment implementing the conventional air-bag control apparatus is explained by referring to FIGS. 7 and 8. The carrier generation means 62 on the column side generates typically a sinusoidal carrier like one shown in diagram A of FIG. 8 at normal times. This carrier is supplied to the modulation circuit 63 which is typically a balanced modulation circuit. At normal times, however, the modulation circuit 63 does not output a modulated carrier. Only when a modulation signal is supplied to the modulation circuit 63 does the modulation circuit 63 output a modulated carrier. Assume that the air-bag sensor 61 detects a car collision at point of time t0. In this case, the air-bag sensor 61 generates a predetermined voltage E as shown in diagram B of FIG. 8. The voltage E serves as modulation signal supplied to the modulation circuit 63. As a result, the modulation circuit 63 modulates the carrier supplied thereto by the carrier generation circuit 62 starting from the point of time to as shown in diagram C of FIG. 8 and outputs a modulated carrier to the transmission circuit 64. The transmission circuit 64 transmits the modulated carrier received from the modulation circuit 63 to the reception circuit 65. A signal is transmitted from the transmission circuit 64 to the reception circuit 65 through typically a non-contact coupling means (or a non-contact coupler not shown in the figure). The reception circuit 65 passes on the modulated carrier received from the transmission circuit 64 to the demodulation circuit 66. The demodulation circuit 66 demodulates the modulated carrier received from the reception circuit 65 to produce a predetermined voltage E' shown in diagram D of FIG. 8 as a demodulated signal which is supplied to the air-bag driving control circuit 67. The air-bag driving control circuit 67 drives the air-bag unit in accordance with the demodulated signal.

Figure 8A:
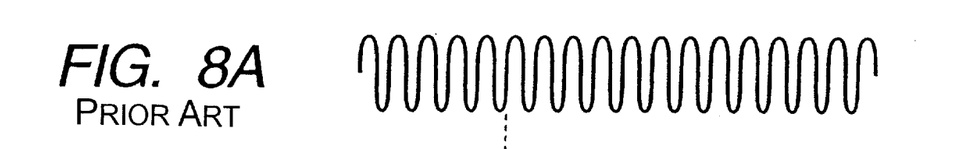
FIG. 8A–8F are diagrams showing signals at main components of the conventional air-bag control apparatus shown in FIG. 7.
Figure 8B:
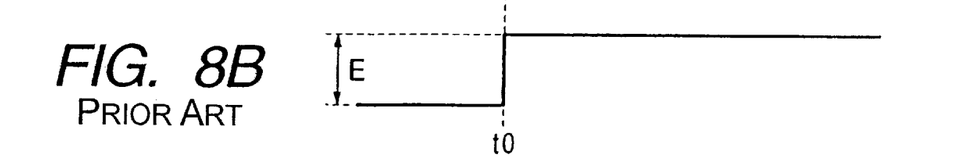
Figure 8C:
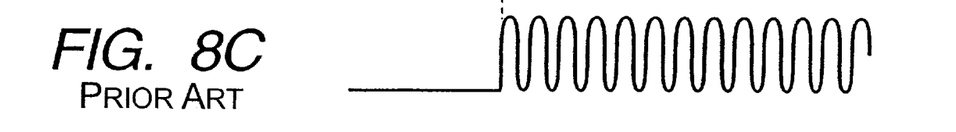
Figure 8D:
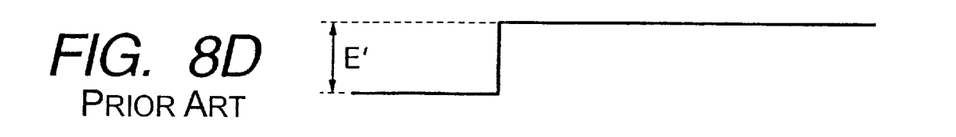
Figure 8E:
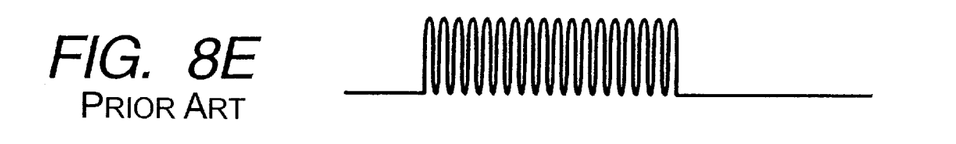
Figure 8F:
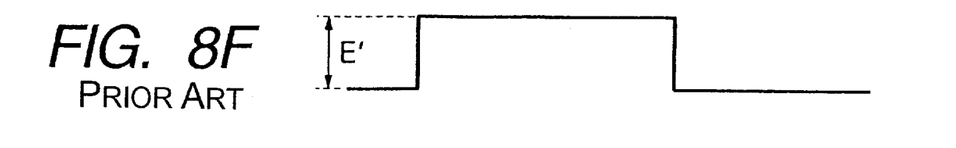

Additionally, in recent years, there are many other pieces of electronic equipment installed in a car. The other electronic equipment generate and radiate a variety of electromagnetic waves and. An electromagnetic wave generated by the other electronic equipment may be introduced onto a transmission line between, for example, the modulation circuit 63 and the demodulation circuit 66 in the configuration of the conventional embodiment in spite of the fact that the car does not collide with anything and, hence, the air-bag sensor 61 does not generate the predetermined voltage E. When such an electromagnetic wave is introduced onto the transmission line, a noise signal like one shown in diagram E of FIG. 8 is supplied to the demodulation circuit 66 which then demodulates to inadvertently generate a demodulated signal like one shown in diagram F of FIG. 8. The demodulated signal is supplied to the air-bag driving control circuit 67. When this happens, the air-bag driving control circuit 67 inadvertently drives the air-bag unit in accordance with the demodulated signal generated by the demodulation circuit 66 in spite of the fact that the demodulated signal originates from an introduced noise signal.

When the air-bag unit is driven in spite of the fact that no accident such as a car collision takes place, the driver's field of vision is blocked and driving is disturbed.

SUMMARY OF THE INVENTION

It is thus an object of the present invention to avoid a malfunction of an air-bag unit caused by an electromagnetic wave generated by various kinds of electronic equipment.

According to a first aspect of the present invention, there is provided an air-bag control apparatus: wherein first modulation means modulates a first carrier in accordance with a signal having a predetermined pattern from signal generation means to generate a first modulated signal and supply it to first demodulation means when collision detection means detects a car collision; the first demodulation means demodulates the first modulated signal to produce a first demodulated signal and supply it to signal comparison means; and the signal comparison means outputs an activation signal for activating an air bag only if the first demodulated signal matches the signal having the predetermined pattern.

According to a second aspect of the present invention, there is provided an air-bag control apparatus as in the first aspect, wherein the signal generation means comprises a plurality of switches for controlling car electronic equipment and a signal generation circuit for generating the signal having the predetermined pattern in accordance with an operating state of the switches.

According to a third aspect of the present invention, there is provided an air-bag control apparatus as in the second aspect, wherein the switches are installed on a steering wheel.

According to a fourth aspect of the present invention, there is provided an air-bag control apparatus as in the first, second or third aspect, wherein, the second modulation means modulates the second carrier in accordance with the signal having the predetermined pattern output from signal generation means to generate a second modulated signal and supply it to the second demodulation means; the second demodulation means demodulates the second modulated signal to produce a second signal; and the first modulation means modulates the first carrier in accordance with the second signal.

According to a fifth aspect of the present invention, there is provided an air-bag control apparatus as in the first aspect, wherein the signal generation means comprises a data retention unit for storing data having a predetermined format and a microcomputer, and the microcomputer reads out the data and generates the signal having the predetermined pattern.

According to a sixth aspect of the present invention, there is provided an air-bag control apparatus as in the fifth aspect, wherein two data retention units and two microcomputers are provided, and one of the data retention units and one of the microcomputers are provided on a column side, and one of the data retention units and one of the microcomputers are provided on a steering-wheel side.

DETAILED DESCRIPTION OF THE PREFERRED EMBODIMENTS

Figure 1:
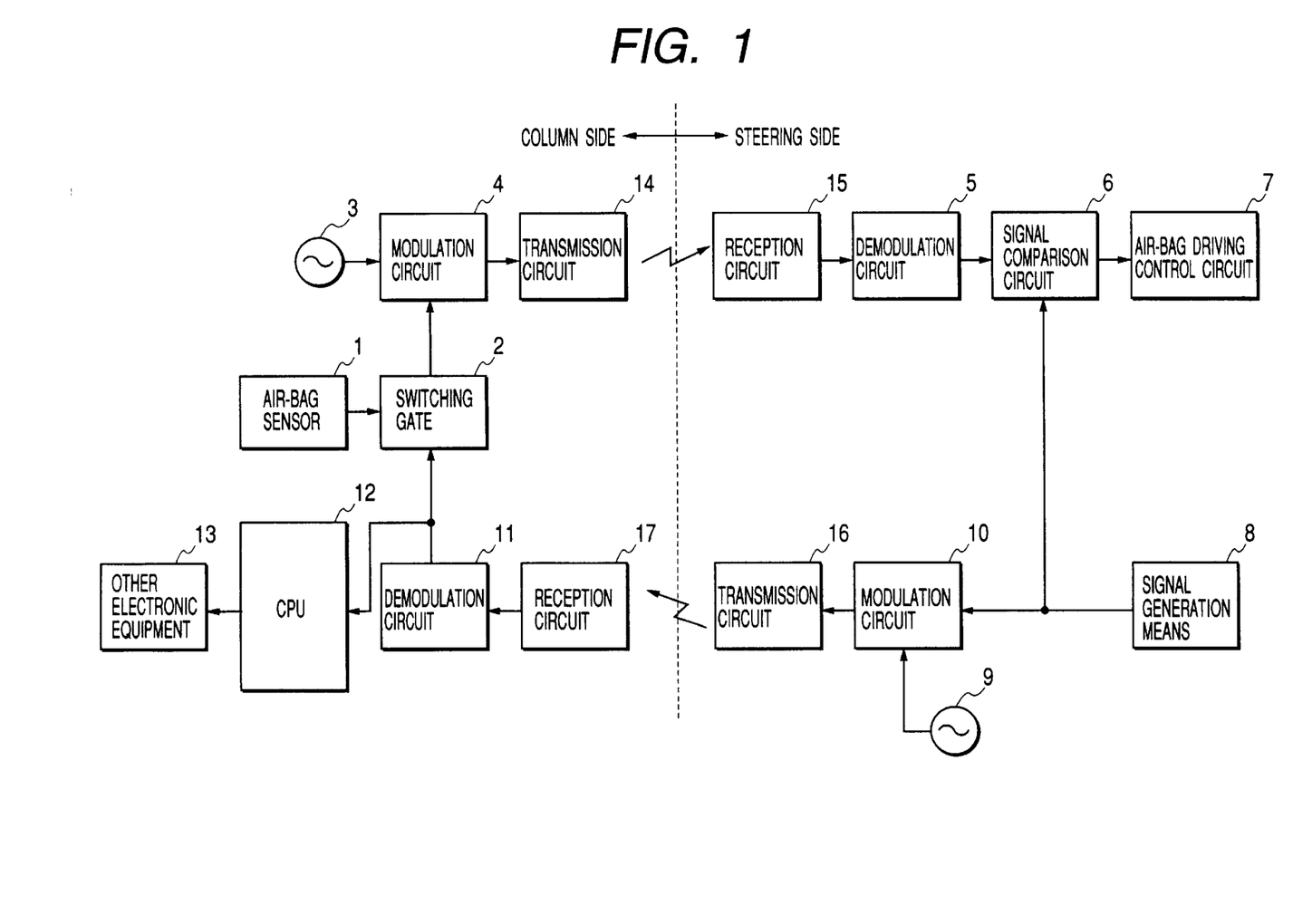
FIG. 1 is a block diagram showing one embodiment of the configuration of an air-bag control apparatus provided by the present invention.
Figure 2:
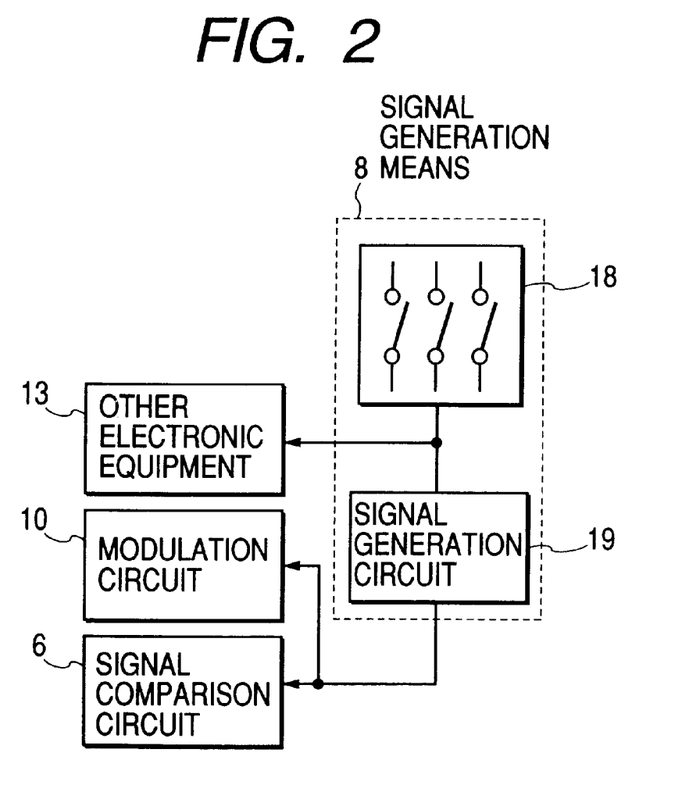
FIG. 2 is a block diagram showing another embodiment of the configuration of an air-bag control apparatus provided by the present invention.
Figure 3:
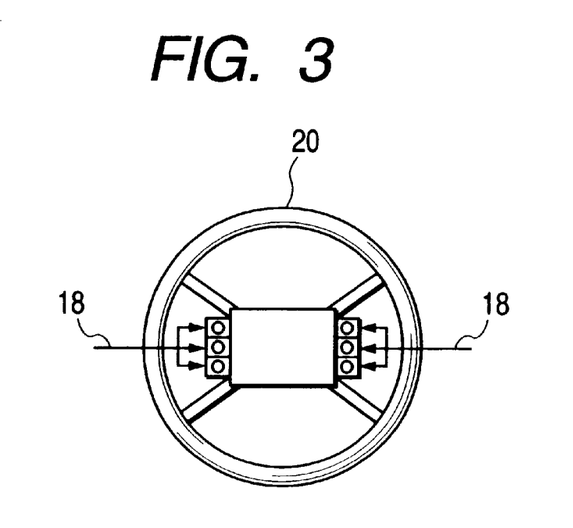
FIG. 3 is a diagram showing an embodiment of a layout of switches of the air-bag control apparatus provided by the present invention.
Figures 4A, 4B:
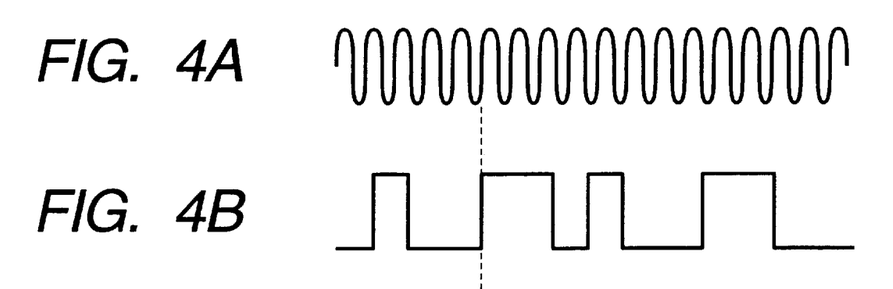
FIGS. 4A–4G are diagrams showing signals at main components of the embodiment implementing the air-bag control apparatus provided by the present invention as shown in FIG. 1.
Figure 4C:
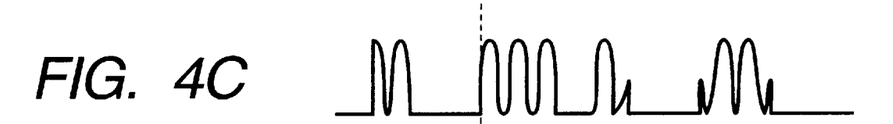
Figure 4D:
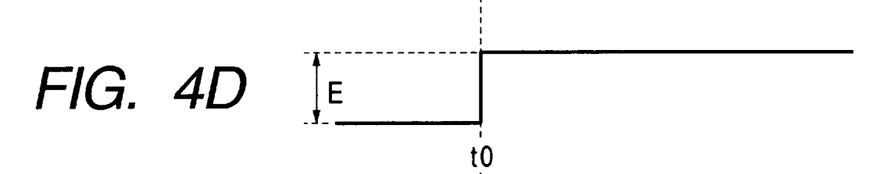
Figure 4E:
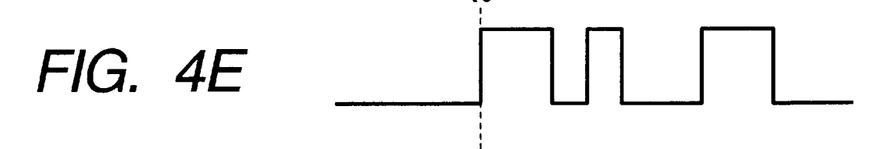
Figure 4F:
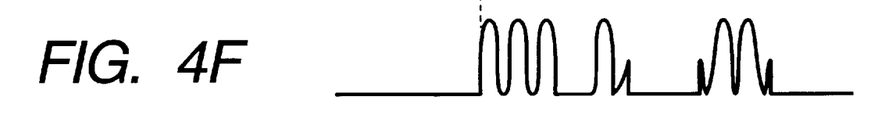
Figure 4G:
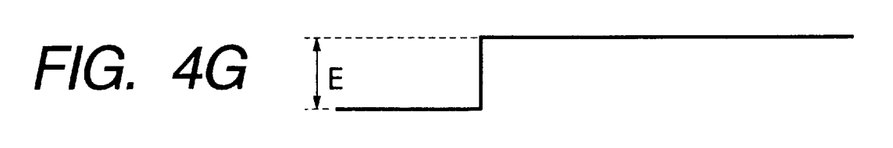
Figure 5:
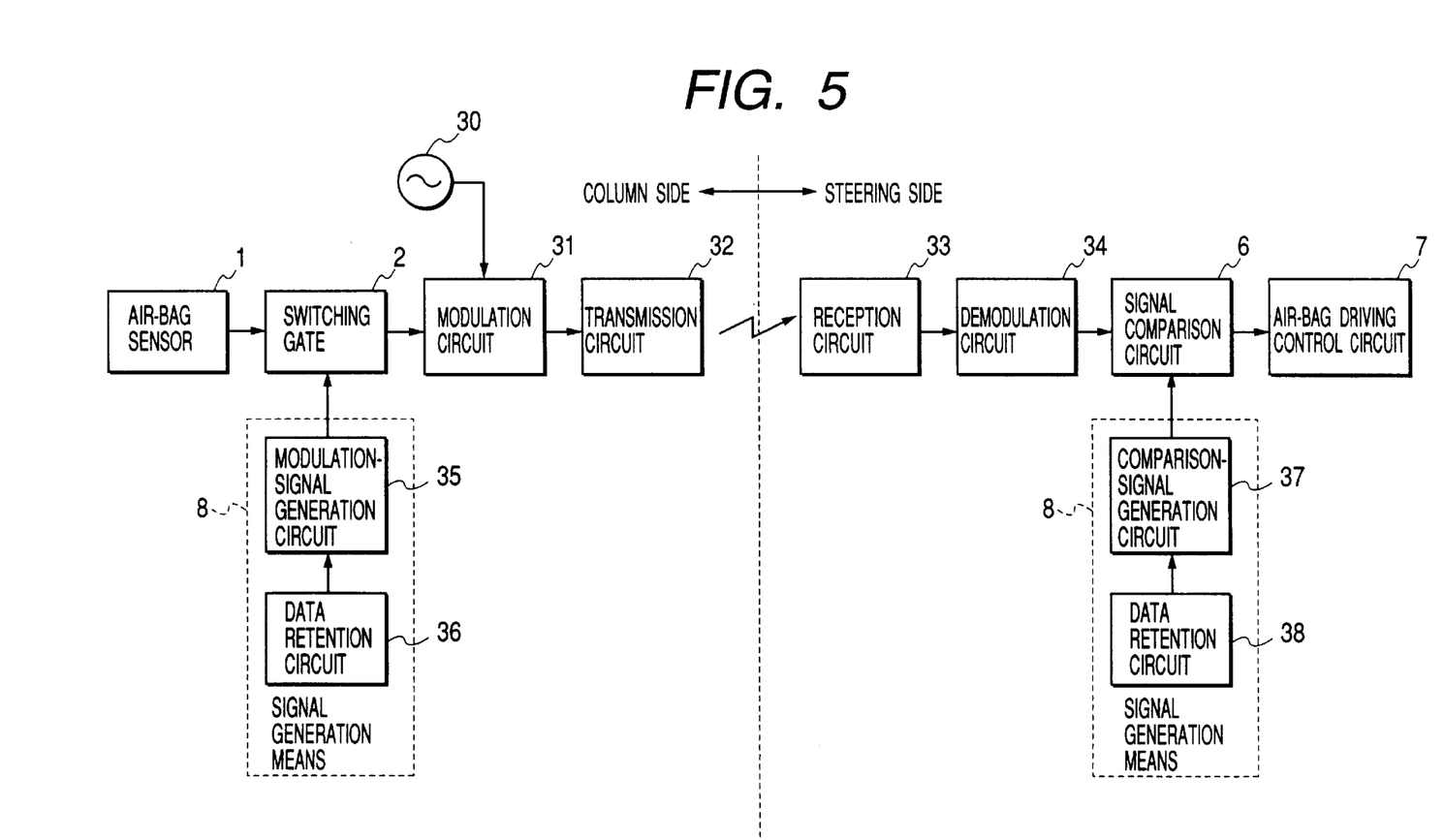
FIG. 5 is a block diagram showing the configuration of a signal generation means of the air-bag control apparatus implemented by another embodiment of the present invention.
Figure 6A:
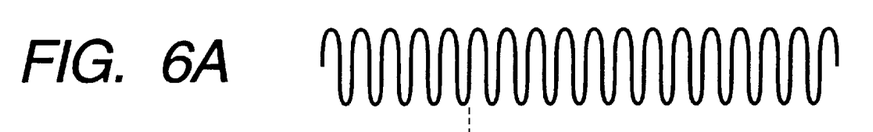
FIGS. 6A–6F are diagrams showing signals at main components of the embodiment implementing the air-bag control apparatus provided by the present invention as shown in FIG. 5.
Figure 6B:
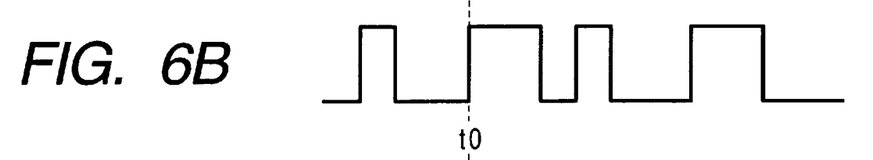
Figure 6C:
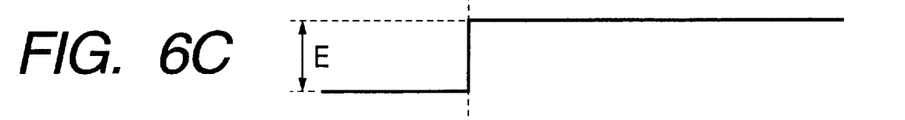
Figure 6D:
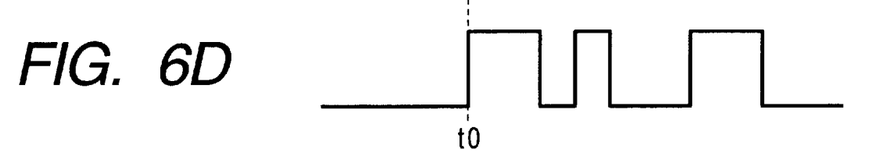
Figure 6E:
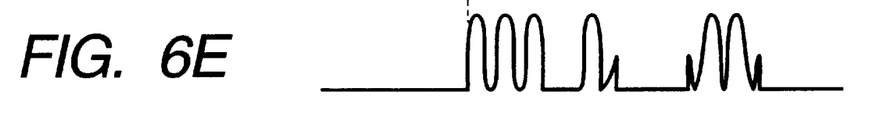
Figure 6F:
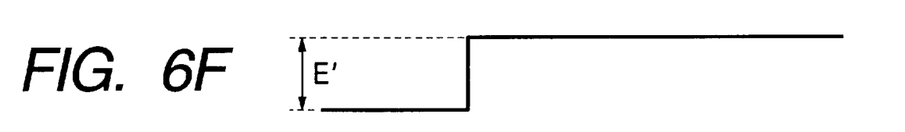

The present invention will become more apparent from a careful study of the following detailed description of some preferred embodiments with reference to the accompanying diagrams. FIG. 1 is a block diagram showing the configuration of an air-bag control apparatus provided by the present invention. FIG. 2 is a block diagram showing the configuration of a signal generation means employed in the air-bag control apparatus provided by the present invention. FIG. 3 is a diagram showing a layout of switches on a steering wheel of the air-bag control apparatus provided by the present invention. FIG. 5 is a block diagram showing the configuration of an air-bag control apparatus implemented by another embodiment of the present invention. FIGS. 4 and 6 are diagrams each showing principal signals in a variety of components composing the air-bag control apparatus provided by the present invention.

First of all, the configuration of an embodiment of the present invention is explained by referring to FIGS. 1 and 2. As shown in FIG. 1, on the column side, there are provided, among other components, an air-bag sensor 1 for detecting a collision of the car, a switching gate 2 functioning as a gate, a first-carrier generation means 3 for generating a first carrier, a first modulation circuit 4 for modulating the first carrier, a first transmission circuit 14 for transmitting a first modulated carrier to the steering-wheel side, a second reception circuit 17 for receiving a signal from the steering-wheel side, a second demodulation circuit 11, a CPU 12 and other electronic equipment 13. On the steering-wheel side, on the other hand, there are provided, among other components, a first reception circuit 15 for receiving the first modulated carrier from the column side, a first demodulation circuit 5, a signal comparison circuit 6, an air-bag driving control circuit 7, a signal generation means 8, a second-carrier generation means 9 for generating a second carrier, a second modulation circuit 10 for modulating the second carrier, a second transmission circuit 16 for transmitting a second modulated carrier to the steering-wheel side. As shown in FIG. 2, the signal generation means 8 has a plurality of switches 18 which are installed on the steering wheel 20 in a layout like typically one shown in FIG. 3. The switches 18 are used for controlling the other equipment 13. In addition, a signal generation circuit 19 generates a signal of a predetermined pattern in accordance with the operating state of the switches 18. The signal generated by the signal generation circuit 19 is supplied to the second modulation circuit 10 and the signal comparison circuit 6.

Next, the operation of this embodiment of the present invention is explained by referring to FIGS. 1 and 4. The first carrier generation means 3 on the column side generates typically a sinusoidal carrier like one shown in diagram A of FIG. 4 at normal times. This carrier is supplied to the first modulation circuit 4 which is typically a balanced modulation circuit. At normal times, however, the first modulation circuit 4 does not output a modulated carrier. Only when a modulation signal is supplied does, the modulation circuit 4 output a modulated carrier. On the steering-wheel side, on the other hand, the signal generation means 8 continuously generates a signal having a predetermined pattern like one shown in diagram B of FIG. 4, supplying the signal to the signal comparison circuit 6 and the second modulation circuit 10. At normal times, the second-carrier generation means 9 generates a carrier similar to the one which is generated by the first-carrier generation means 3 as shown in diagram A of FIG. 4. The carrier is supplied to the second modulation circuit 10 which is also typically a balanced modulation circuit. At normal times, however, the second modulation circuit 10 does not output a modulated carrier. Only when a modulation signal is supplied does, the modulation circuit 10 output a modulated carrier. The second modulation circuit 10 modulates the carrier by using the signal received from the signal generation circuit 8 as a modulation signal, outputting a result of modulation as a second modulated carrier like one shown in diagram C of FIG. 4 to the second demodulation circuit 11 on the column side by way of the second transmission circuit 16 on the steering-wheel side and the second reception circuit 17 on the column side. A signal is transmitted from the second transmission circuit 16 to the second reception circuit 17 through typically a non-contact coupling means (or a non-contact coupler not shown in the figure).

The second demodulation circuit 11 demodulates the second modulated carrier into a second demodulated signal like the one shown in diagram B of FIG. 4, outputting the demodulated signal to the switching gate 2. Assume that the air-bag sensor 1 detects a car collision at a point of time t0. In this case, the air-bag sensor 1 generates a predetermined voltage E as shown in diagram D of FIG. 4. The voltage E is supplied to the switching gate 2 to open the gate 2. With the switching gate 2 opened, the gate 2 passes on the demodulated signal with a predetermined pattern like one shown in diagram E of FIG. 4 from the second demodulation circuit 11 and outputs the demodulated signal to the first modulation circuit 4 as a modulation signal. As a result, the first modulation circuit 4 modulates the first carrier supplied thereto by the first-carrier generation means 3 starting from the point of time t0 as shown in diagram F of FIG. 4 and outputs a first modulated carrier to the first transmission circuit 14. The first transmission circuit 14 transmits the first modulated carrier received from the first modulation circuit 4 to the first reception circuit 15 on the steering-wheel side. A signal is transmitted from the first transmission circuit 14 to the first reception circuit 15 through typically a non-contact coupling means (or a non-contact coupler not shown in the figure).

The first reception circuit 15 passes on the first modulated carrier received from the first transmission circuit 14 to the first demodulation circuit 5. The first demodulation circuit 5 demodulates the first modulated carrier received from the first reception circuit 15 to produce a first demodulated signal like one shown in diagram E of FIG. 4. The first demodulated signal is supplied to the signal comparison circuit 6. The signal comparison circuit 6 compares the first demodulated signal received from the first demodulation circuit 5 with the modulation signal received from the signal generation means 8 with timing determined by synchronization between the first demodulated signal and the modulation signal. Only if the first demodulated signal matches the modulation signal is a predetermined voltage E' serving as an activation signal like one shown in diagram G of FIG. 4 output to the air-bag driving control circuit 7. The air-bag driving control circuit 7 drives the air-bag unit in accordance with the predetermined voltage E'. If the signal comparison circuit 6 finds that the first demodulated signal does not match the modulation signal, on the other hand, the signal comparison circuit 6 does not generate the predetermined voltage E'. As a result, the air bag will not function incorrectly due to a noise signal. It should be noted that the second demodulated signal generated by the second demodulation circuit 11 is supplied to the CPU 12 too. The CPU 12 controls the operation of the other electronic equipment 13 in accordance with the second demodulated signal received from the second demodulation circuit 11.

Next, the configuration of another embodiment of the present invention is explained by referring to FIG. 5. As shown in FIG. 5, on the column side, there are provided an air-bag sensor 1 used as a collision detection means for detecting a collision of the car, a carrier generation means 30 used as a first-carrier generation means for generating a first carrier, a modulation circuit 31 used as a first modulation circuit for modulating the first carrier, a switching gate 2 functioning as a gate, a modulation-signal generation circuit 35 for generating a modulation signal and a first data retention circuit 36 connected to the modulation-signal generation circuit 35, and a transmission circuit 32 for transmitting a modulated carrier to the steering-wheel side. The signal generation means 8 comprising the modulation-signal generation circuit 35 and the first data retention circuit 36 generates a modulation signal having a predetermined pattern. Typically, the modulation-signal generation circuit 35 is implemented by a microcomputer for reading out data with a predetermined format from the first data retention circuit 36 and generating the modulation signal having the predetermined pattern.

On the steering-wheel side, on the other hand, there are provided a reception circuit 33 for receiving the modulated carrier from the column side, a demodulation circuit 34 used as a first demodulation means, a comparison-signal generation circuit 37 for generating a comparison signal, a second data retention circuit 38 connected to the comparison-signal generation circuit 37, a signal comparison circuit 6 for comparing a demodulated signal received from the demodulation circuit 34 and comparison-signal generation circuit 37, and an air-bag driving control circuit 7. As described above, the signal generation means 8 for generating a signal with a predetermined pattern comprises the comparison-signal generation circuit 37 and the second data retention circuit 38. Much like the modulation-signal generation circuit 35, the comparison-signal generation circuit 37 is implemented typically by a microcomputer for reading out data with a predetermined format from the second data retention circuit 38 and generating the comparison signal having the predetermined pattern. The data stored in the second data retention circuit 38 is the same as the data stored in the first data retention circuit 36 on the column side. Thus, the modulation signal generated by the modulation-signal generation circuit 35 has the same pattern as the comparison signal generated by the comparison-signal generation circuit 37. In addition, the function of the switching gate 2 may be included in the microcomputer or a CPU used as a typical means for implementing the modulation-signal generation circuit 35 as described above. Similarly, the function of the signal comparison circuit 6 may be included in the microcomputer or a CPU used as a typical means for implementing the comparison-signal generation circuit 37 as described above.

Next, the operation of the other embodiment of the present invention is explained by referring to FIGS. 5 and 6. The carrier generation means 30 generates typically a sinusoidal carrier like one shown in diagram A of FIG. 6 at normal times. This carrier is supplied to the modulation circuit 31 which is typically a balanced modulation circuit. At normal times, however, the first modulation circuit 31 does not output a modulated carrier. Only when a modulation signal is supplied does, the modulation circuit 31 output a modulated carrier. In the meantime, the modulation-signal generation circuit 35 reads out data with a predetermined format from the first data retention circuit 36 and outputs a modulation signal having a predetermined pattern like one shown in diagram B of FIG. 6 to the switching gate 2. Assume that the air-bag sensor 1 detects a car collision at a point of time t0. In this case, the air-bag sensor 1 generates a predetermined voltage E as shown in diagram C of FIG. 6. The voltage E is supplied to the switching gate 2 to open the gate 2. With the switching gate 2 opened, the gate 2 passes on a signal with a predetermined pattern like one shown in diagram D of FIG. 6 from the signal generation means 8 and outputs the signal to the modulation circuit 31 as a modulation signal. As a result, the modulation circuit 31 modulates the carrier supplied thereto by the carrier generation means 30 starting from the point of time t0 as shown in diagram E of FIG. 6 and outputs a modulated carrier to the transmission circuit 32. The transmission circuit 32 transmits the modulated carrier received from the modulation circuit 31 to the reception circuit 33 on the steering-wheel side. A signal is transmitted from the transmission circuit 32 to the reception circuit 33 through typically a non-contact coupling means (or a non-contact coupler not shown in the figure).

The reception circuit 33 passes on the modulated carrier received from the transmission circuit 32 to the demodulation circuit 34. The demodulation circuit 34 demodulates the modulated carrier received from the reception circuit 33 to produce a demodulated signal like one shown in diagram D of FIG. 6. The demodulated signal is then supplied to the signal comparison circuit 6. In the meantime, the comparison-signal generation circuit 37 reads out data with a predetermined format from the second data retention circuit 38 and outputs the comparison signal having a predetermined pattern like the one shown in diagra B of FIG. 6 to the signal comparison circuit 6. The signal comparison circuit 6 compares the demodulated signal received from the demodulation circuit 34 with the comparison signal received from the comparison-signal generation circuit 37 with timing determined by synchronization between the demodulated signal and the comparison signal. Only if the demodulated signal matches the comparison signal is a predetermined voltage E' serving as an activation signal like one shown in diagram F of FIG. 6 output to the air-bag driving control circuit 7. The air-bag driving control circuit 7 drives the air-bag unit in accordance with the predetermined voltage E'.

The technique for modulating a carrier in the air-bag control apparatus described above is AM modulation. It should be noted that FM-modulation and FM-modulation techniques are of course capable of providing the same effects.

The air-bag control apparatus provided by the present invention exhibits the following effects.

According to a first aspect of the present invention, there is provided an air-bag control apparatus, wherein first modulation means modulates a first carrier in accordance with a signal having a predetermined pattern from signal generation means to generate a first modulated signal and supply it to first demodulation means when collision detection means detects a car collision; the first demodulation means demodulates the first modulated signal to produce a first demodulated signal and supply it to signal comparison means; and the signal comparison means outputs an activation signal for activating an air bag only if the first demodulated signal matches the signal having the predetermined pattern.

As a result, the activation signal is not generated by a noise signal caused by an effect of an electromagnetic wave originated from other electronic equipment.

According to a second aspect of the present invention, there is provided an air-bag control apparatus as in the first aspect wherein a signal generation means comprises a plurality of switches for controlling car electronic equipment and a signal generation circuit for generating the signal having the predetermined pattern in accordance with an operating state of the switches.

As a result, since the switches used for other electronic equipment are used, it is possible to generate the signal having the predetermined pattern without the need to provide a new switch.

According to a third aspect of the present invention, there is provided an air-bag control apparatus as in the second aspect wherein the switches are installed on a steering wheel. As a result, since the switches are installed on the steering wheel in front of the eyes of the driver, the switches can be operated with ease without the need for the driver to turn the driver's eyes away from the line of vision.

According to a fourth aspect of the present invention, there is provided an air-bag control apparatus as in the first, second or third aspect wherein, a signal having the predetermined pattern output from the signal generation means is supplied to the first modulation means via a second modulation means and second demodulation means, the first modulation means modulates the first carrier in accordance with the signal demodulated by the second demodulation means.

Thus, the signal generated by the signal generation means with the predetermined pattern is hardly affected by an electromagnetic wave generated by other electronic equipment. As a result, the signal having the predetermined pattern can be transmitted with a high degree of precision.

According to a fifth aspect of the present invention, there is provided an air-bag control apparatus as in the first aspect wherein; in the signal generation means, a microcomputer reads out the data and generates the signal having the predetermined pattern.

As a result, the signal is generated by the microcomputer with always the same pattern. In addition, by setting the data stored in the data retention means properly for transmission of the signal in advance, the signal can be transmitted with a high degree of precision.

According to a sixth aspect of the present invention, there is provided an air-bag control apparatus as in the fifth aspect wherein, two data retention units and two microcomputers are provided, and one of the data retention units and one of the microcomputers are provided on a column side, and one of the data retention units and one of the microcomputers are provided on a steering-wheel side.

As a result, since a signal with a predetermined format can be generated on the column side and the steering-wheel side, it is not necessary to provide a transmission line for transmitting the signal having the predetermined pattern.

What is claimed is:

1. An air-bag control apparatus comprising:
   collision detection mechanism operative to detect a car collision;
   first-carrier generation mechanism generating a first carrier;
   first modulation mechanism inputting the first carrier;
   signal generation mechanism generating a signal having a predetermined pattern;
   first demodulation means; and
   signal comparison means,
   wherein:
      the first modulation mechanism modulates the first carrier in accordance with a signal corresponding to the signal having the predetermined pattern to generate a first modulated signal and supply the first modulated signal to the first demodulation means when the collision detection mechanism detects a car collision;
      the first demodulation means demodulates the first modulated signal to produce a first demodulated signal and supply the first demodulated signal to the signal comparison means; and
      the signal comparison mechanism outputs an activation signal activating an air bag only if the first demodulated signal matches the signal having the predetermined pattern.

2. An air-bag control apparatus according to claim 1 wherein the signal generation mechanism comprises a plurality of switches controlling car electronic equipment and a signal generation circuit generating the signal having the predetermined pattern in accordance with an operating state of the switches.

3. An air-bag control apparatus according to claim 2 wherein the switches are installed on a steering wheel.

4. An air-bag control apparatus according to claim 3, the apparatus further including:
   a second modulation mechanism inputting a second carrier; and
   a second demodulation means,
   wherein,
      the second modulation mechanism modulates the second carrier in accordance with the signal having the predetermined pattern output from the signal generation mechanism to generate a second modulated signal and supply the second modulated signal to the second demodulation means;

the second demodulation means demodulates the second modulated signal to produce a second signal having the same pattern as the signal having the predetermined pattern; and the signal used by the first modulation mechanism to modulate the first carrier constitutes the second signal.

5. An air-bag control apparatus according to claim 2, the apparatus further including:

a second modulation mechanism inputting a second carrier; and a second demodulation means, wherein, the second modulation means modulates the second carrier in accordance with the signal having the predetermined pattern output from the signal generation mechanism to generate a second modulated signal and supply the second modulated signal to the second demodulation means;

the second demodulation means demodulates the second modulated signal to produce a second signal having the same pattern as the signal having the predetermined pattern; and the signal used by the first modulation mechanism to modulate the first carrier constitutes the second signal.

6. An air-bag control apparatus according to claim 1, wherein two data retention units and two signal generation means are provided, one of the two data retention units is provided on a column side, the other of the two data retention units is provided on a steering-wheel side, one of the signal generation means has a modulation-signal generation circuit and is arranged at the column side, and the other signal generation means has a comparison-signal generation circuit for outputting a signal to be inputted to the signal comparing means and is arranged at the steering-wheel side.

7. An air-bag control apparatus according to claim 1, the apparatus further including:

a second modulation mechanism inputting a second carrier; and a second demodulation means, wherein, the second modulation mechanism modulates the second carrier in accordance with the signal having the predetermined pattern output from the signal generation mechanism to generate a second modulated signal and supply the second modulated signal to the second demodulation means;

the second demodulation means demodulates the second modulated signal to produce a second signal having the same pattern as the signal having the predetermined pattern; and the signal used by the first modulation mechanism to modulate the first carrier constitutes the second signal.

8. An air-bag control apparatus according to claim 1, wherein the signal generation mechanism comprises a data retention unit for storing data having a predetermined format, and for reading out the data and generating the signal having the predetermined pattern.

* * * * *